July 4, 1961     A. H. ROSENTHAL     2,991,363
NEUTRON DETECTION AND MEASURING DEVICES
Filed March 9, 1954
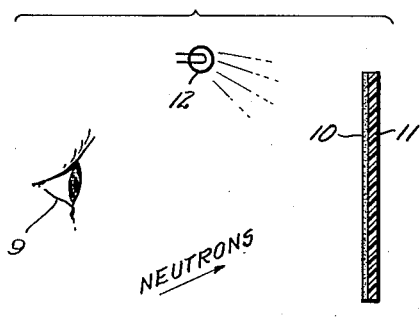
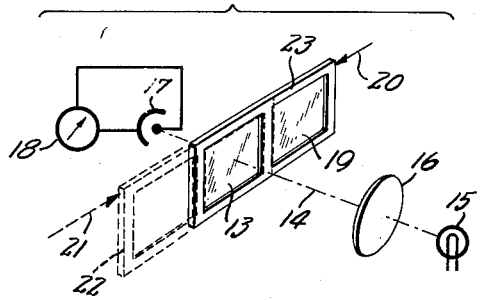
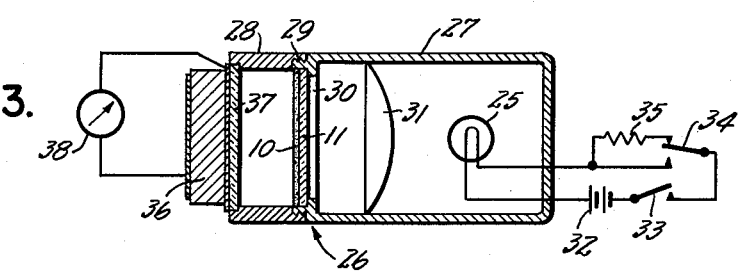
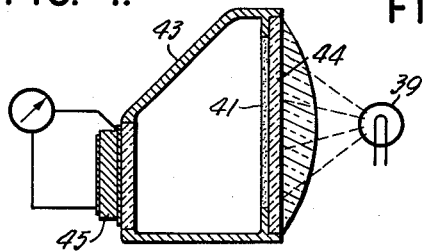
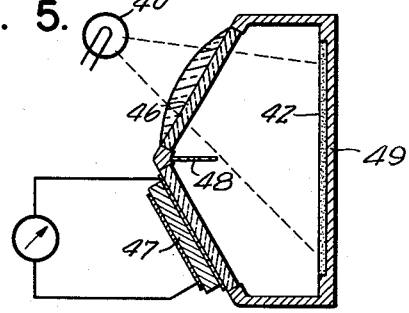
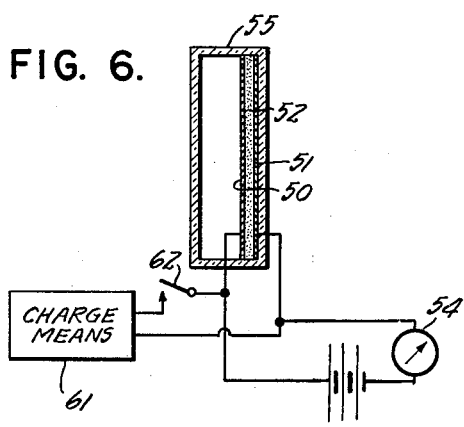
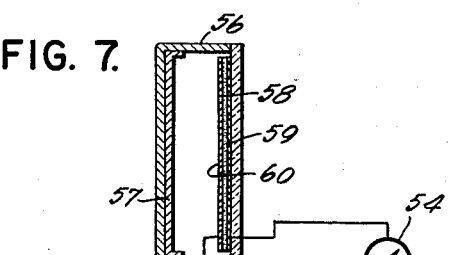
INVENTOR.
ADOLPH H. ROSENTHAL
BY Mitchell Bechert
ATTORNEYS

United States Patent Office 2,991,363
Patented July 4, 1961

2,991,363
NEUTRON DETECTION AND MEASURING DEVICES

Adolph H. Rosenthal, Forest Hills, N.Y., assignor to Fairchild Camera and Instrument Corporation, Syosset, N.Y., a corporation of Delaware
Filed Mar. 9, 1954, Ser. No. 415,054
7 Claims. (Cl. 250—83.1)

This invention relates to radiant-energy-responsive means and, in particular, to means responsive to neutron radiation.

It is an object of the invention to provide improved neutron-responsive means.

It is another object to provide means indirectly photoelectrically responsive to neutron radiations.

It is a further object to provide improved means developing a direct electrical evaluation of exposure to neutron radiation.

It is still another object to provide neutron-responsive means of variable optical opacity.

It is a specific object to provide an improved neutron dosimeter.

Other objects and various further features of novelty and invention will be pointed out or will become apparent to those skilled in the art from a reading of the following specification in conjunction with the accompanying drawings. In said drawings, which show, for illustrative purposes only, preferred forms of the invention:

FIG. 1 is a simplified diagrammatic view illustrating basic functioning in accordance with the invention;

FIG. 2 is an optical diagram in perspective, schematically illustrating the functional relation of parts of one form of the invention;

FIG. 3 is a simplified longitudinal sectional view of a specific apparatus embodying features of the invention; and FIGS. 4 to 7 are simplified cross-sectional views illustrating modifications.

Briefly stated, the invention contemplates the use of an ionic crystal material of the type in which the injection of electrons (or of particular radiant energy) can produce either an opaque (or colored) deposit in the material, or a change in the optical density of the material, or a change of the electrical conductivity in the material. Such changes, or deposits are connected with F-center (Farbzentren) colorations. Crystals of the character indicated are not ordinarily responsive to neutron radiation, but by juxtaposition of such crystals to, or admixture of such crystals with, fissionable material, the radiant energy released upon fission resulting from neutron bombardment is able to produce F-center formation in the ionic crystals. As indicated above, the F-center formation is characterized by color deposits, opacity changes, and conductivity changes; and of course the extent and nature of these F-center responses will depend upon the particular material used.

Examples of the ionic crystals contemplated include many of the alkali and alkaline-earth halides, such as the chlorides, bromides and iodides of sodium and potassium, lithium bromide, calcium fluoride, and strontium fluoride and chloride. Also included are certain silver salts, such as silver bromide. All of these crystals belong to the class of so-called ionic crystals in which there are electrically positive and negative ion components, and the forces that hold these lattice components together are electrostatic, at least in part.

Neutrons do not produce directly F-center formation and colorations (or other effects related thereto) in ionic crystals. However, as indicated above, F-centers may be formed by neutrons through secondary processes, resulting from radiations from fissionable materials added to the ionic crystal material, the fission products and energy associated therewith being employed for ionization of the crystal-lattice members. In this connection, neutron-fissionable material, such as uranium or a compound of uranium, can be either mixed with the ionic-crystal material or brought close to a screen of such material. For slow-neutron sensitive devices, an admixture rich in $U_{235}$, as in the form of uranium oxide or a suitable salt (e.g. uranium chloride, should the ionic-crystal material be potassium chloride) is to be preferred. For fast-neutron sensitive devices, the mixture should be rich in $U_{238}$.

The above-discussed principle lends itself to various constructions and embodiments. The materials can be in the form of films in suitable emulsions, as for use in cheap neutron detectors or in screens contained in cells, preferably evacuated for more precise dosimeters. Various of these specific forms are separately discussed below.

FIG. 1 illustrates the use of a relatively inexpensive neutron-responsive screen exhibiting F-center colorations. The screen may comprise a single layer 10 applied to a glass, film, or the like base 11. The layer 10 may consist of an emulsion containing substantial proportions of ionic crystals and of fissionable material. These materials are preferably fixed with respect to each other and to the base 11 in a suitable vehicle, such as transparent plastic, gelatin, or the like.

Upon bombardment of the layer 10 by neutrons, fission will take place in the fissionable material and radiant energy will be released, producing the various end results which are characteristic of F-center formation. Thus, depending upon the exposure to neutrons, the opacity and reflectivity of the emulsion 10 may change and conductivity changes may take place. If the emulsion 10 is then subjected to light, as by observation in daylight or under artificial light 12, an immediate indication of neutron exposure may be had. FIG. 1 illustrates that this indication may be directly visibly evaluated by the eye 9 in the case of light from source 12 reflected off the emulsion surface 10, through the reflectivity changes caused by changed opacity. The visual evaluation may be just as effective for the case of a transparent base 11 if the observation is made for light transmitted through emulsion 10.

FIG. 2 illustrates a means for more objective evaluation of the opacity of the screen 13, which may be of the nature described at 10 in FIG. 1 and supported on a transparent base 11. Thus the ionic-crystal screen containing F-center material may be placed on an optical axis 14, including a light source 15, condenser optics 16, and photoelectric means 17. Meter 18 indicates that a direct electrical meter reading may be available for the transparency or opacity evaluation of the screen 13.

In order to establish a reference for purposes of developing a more absolute determination of neutron exposure, rather than merely relative neutron exposure, densitometer methods may be applied to the relative-opacity evaluation of the F-center screen 13 and of a reference screen 19. The densitometer comparison may be side by side and continuous, and the screen 19 for such purposes may be of pre-calibrated, manually controlled, opacity or density; but screen 19 is shown as of datum opacity or density and it is indicated schematically by means of arrows 20—21 and by the dashed outline 22 that a single frame 23 containing both screens 13—19 may be selectively shifted, so as to alternate the placement of screen 19 and of screen 13 on the optical axis 14. By noting the meter reading 18 when screen 19 is on the optical axis, and by comparing this reading with the meter indication when screen 13 is on the optical axis, a direct quantitative evaluation of neutron exposure may be available, as will be understood.

FIGURE 3 illustrates a specific form of neutron dosimeter which may be unit-handling, with its own light source 25 contained within a chamber 26, which is substantially light-tight. The chamber 26 is shown in essentially two parts 27—28 removably secured to each other by screw means 29, in order to permit replacement of the novel screen means 10—11 whenever necessary, as when converting the dosimeter for response to fast neutrons or to slow neutrons. The screen means 10—11 are shown seated against a shoulder 30 at one end of the chamber half 27 which also contains a condenser lens 31 and a light source 25. Power for the light source 25 may be available in the same dosimeter package as the described parts, but the electrical parts are schematically shown as external. These electrical parts may comprise a battery 32, an on-off switch 33, and a brightness control comprising a switch 34 and a resistor 35.

It is a property of screens of the character indicated at 10—11 that a strong illumination will erase the opacity formed through the neutron radiation. The structure of FIG. 3 lends itself to use of this property, for, by increasing the brilliance of light source 25, as by throwing the switch 34, the F-center colorations may be erased and the instrument readied for succeeding neutron-dosage evaluations.

The described parts of the dosimeter of FIG. 3 may be used for direct visual interpretation of neutron dosage, but for more accurate determinations, the other part 28 of the chamber is provided with photoelectric means 36 which are shown mounted on a transparent window 37 at the end of the part 28 and facing the screen 10—11. Meter readings at 38 may provide direct evaluations, as discussed in connection with FIG. 2.

FIGS. 4 and 5 illustrate dosimeters of simpler alternative construction, in which reliance is made upon external light sources 39—40 for subjecting the screen means 41—42 to light. Both dosimeters lend themselves to evacuation, or to filling with special, e.g. fissionable gases (such as uranium hexafluoride), and the device of FIG. 4 responds to transmitted light, while that of FIG. 5 responds to reflected light. In the event that either of the dosimeters of FIGS. 4 and 5 is filled with a radioactive gas, the screen means 41—42 may be merely of F-center material, not necessarily combined with radioactive material.

The chamber 43 of FIG. 4 may thus comprise a generally light-tight enclosure with a transparent window 44 at one end to permit introduction of the external light and with photoelectric means 45 mounted at the other end. It is merely necessary that the fissionable material and the F-center material be interposed between the light source or window 44 and the cell 45, but, for convenience, a composite ionic-crystal, fissionable-material screen 41 is shown directly supported on the window 44.

In FIG. 5, the window 46 for admitting external light to the screen 42 is on the same side of the screen 42 as is the photoelectric cell 47. An internal barrier 48 minimizes direct response of cell 47 to incoming light and serves to limit response essentially to light reflected from screen 42. For improved contrast range, either the rear surface of screen 42 or the inner surface of the back wall 49 may be blackened; this, of course, permits the blackened wall 49 to absorb and, therefore, not reflect any light passing through the variably opaque screen 42, so that light reflected by screen 42 is a direct measure of the instantaneous opacity thereof. It should be understood that suitable light-condensing means, such as lenses or mirrors may be associated with light sources 39 and 40.

As indicated generally above, F-center formations in ionic crystals of the character indiacted are accompanied by changes in the conductivity of the crystal lattice. These changes may be evaluated directly by placing the ionic-crystal material between spaced electrodes, as in the case of the electrodes 50—51 of FIG. 6. The screen 52 between electrodes 50—51 may be of the laminated variety, comprising a layer of fissionable material and a layer of ionic-crystal material, but a single mixed layer is shown. The conductivity changes may be monitored at all times with or without amplifier means connected by external leads to the electrodes 50—51, and direct readings may be made at 54 of the exposure to neutron radiation. For protection against abuse, the sandwich 50—51—52 may be hermetically sealed, as suggested by the envelope 55, and this envelope may be evacuated if desired.

FIG. 7 shows a modification of the structure of FIG. 6. According to this modification, the fissionable material may be applied as a layer 57 separate and apart from but, nevertheless, proximate to the layer 58 of ionic-crystal material. It suffices that the electrodes 59—60 merely span the ionic-crystal material, as shown, and the same indicator means may be employed as in FIG. 6.

It will be noted in connection with FIGS. 6 and 7 that direct electrical evaluations of neutron dosage are obtained independent of optical observations. Therefore, the chambers 55—56 for these two constructions may be visually opaque, the only requirement being that they be transparent to neutrons. It is a property of the ionic-crystal materials contemplated herein that F-center formation may be erased not only by light (as described in connection with FIG. 3), but also by heat, or electric fields in combination with the above. It is convenient in FIGS. 6 and 7 that the external electric circuitry shall include means, as at 61—62 in FIG. 6, for applying an electric field to the ionic-crystal sandwich whenever the slate is to be wiped clean, so to speak, and a new neutron dosage is to be evaluated.

It will be seen that a basically simple neutron-responsive structure has been described which lends itself to numerous specific applications. Dosimeters and other neutron-evaluating devices incorporating the neutron-responsive screen means may also be simple and yet provide quantitatively accurate evaluations. The constructions may be rugged and serviceable for relatively long life.

While the invention has been described in detail for the preferred forms shown, it will be understood that modifications may be made within the scope of the invention as defined in the claims which follow.

I claim:

1. In combination, screen means including an ionic-crystal material of the type in which injection of electrons into the crystal lattice can produce an opaque deposit, a neutron-responsive electron source in proximity to said material, and opacity-responsive optical viewing means for observing the relative opacity of said crystal material.

2. In combination, screen means including an ionic-crystal material of the type in which injection of electrons into the crystal lattice can produce an opaque deposit, a neutron-responsive electron source in proximity to said material, means for subjecting said screen means to radiant-energy of a wavelength to which said screen means is variably opaque, and photoelectric means responsive to the level of radiant energy at said screen.

3. The combination of claim 2, in which said radiant-energy subjecting means is on one side of said screen means and said photoelectric means is on the other side of said screen means, whereby said photoelectric means responds to the radiant energy passing through said screen means.

4. The combination of claim 2, in which said radiant-energy subjecting means and said photoelectric means are both on the same side of said screen, said radiant-energy subjecting means and said photoelectric means being so oriented with respect to said side of said screen that said radiant-energy subjecting means subjects said side to said radiant energy and, further, that said photoelectric means responds to any reflection of said radiant energy by said screen.

5. In combination, a relatively light-tight chamber containing a source of light and photoelectric means responsive to light from said source, said chamber being relatively transparent to neutron radiation, and screen means interposed between said light source and said photoelectric means and including an ionic-crystal material having variable opacity reflecting exposure to electrons, said screen means further including a fissionable material, whereby electrons may be available for controlling the opacity of said ionic-crystal material in accordance with the exposure of said fissionable material to neutrons.

6. The device of claim 2, and including a light-tight chamber enclosing said combination, and in which said radiant-energy subjecting means comprises window means in said chamber for exposing said ionic-crystal material to an external source of light.

7. The combination of claim 6, in which said chamber is evacuated.

References Cited in the file of this patent

UNITED STATES PATENTS

| | | |
|---|---|---|
| 2,186,757 | Kallmann et al. | Jan. 9, 1940 |
| 2,188,115 | Kallmann et al. | Jan. 23, 1940 |
| 2,230,618 | Kallmann | Feb. 4, 1941 |
| 2,272,375 | Kallmann et al. | Feb. 10, 1942 |
| 2,408,230 | Shoup | Sept. 24, 1946 |
| 2,558,919 | Zinn | July 3, 1951 |
| 2,608,661 | Zinn | Aug. 26, 1952 |
| 2,648,012 | Scherbatskoy | Aug. 4, 1953 |
| 2,673,934 | Friedman | Mar. 30, 1954 |
| 2,689,308 | Land | Sept. 14, 1954 |

OTHER REFERENCES

Yagoda: Radioactive Measurements with Nuclear Emulsions, copyright 1949, John Wiley & Sons, Inc., pp. 127, 128, 133, 134 and 287 relied upon.